US012089001B2

(12) United States Patent
Chan et al.

(10) Patent No.: US 12,089,001 B2
(45) Date of Patent: Sep. 10, 2024

(54) HEARING DEVICE

(71) Applicant: Sivantos Pte. Ltd., Singapore (SG)

(72) Inventors: Hoong Yih Chan, Singapore (SG); Agustiar Agustiar, Singapore (SG); Soon Hon Lim, Kulaijaya. Johor Darul Ehsan (MY); Shinq Yee Chia, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 197 days.

(21) Appl. No.: 17/839,788

(22) Filed: Jun. 14, 2022

(65) Prior Publication Data

US 2022/0400335 A1 Dec. 15, 2022

(30) Foreign Application Priority Data

Jun. 14, 2021 (DE) ..................... 10 2021 206 011.0

(51) Int. Cl.
*H04R 25/00* (2006.01)
*H04R 1/02* (2006.01)
*H04R 1/42* (2006.01)

(52) U.S. Cl.
CPC ............... *H04R 1/42* (2013.01); *H04R 1/025* (2013.01); *H04R 25/604* (2013.01); *H04R 2400/01* (2013.01)

(58) Field of Classification Search
CPC .. H04R 1/2869; H04R 1/2873; H04R 1/2876; H04R 1/288; H04R 1/2892; H04R 1/2896; H04R 2225/021
See application file for complete search history.

(56) References Cited

U.S. PATENT DOCUMENTS 3,019,306 A * 1/1962 Weiss .................. H04R 25/604 381/322
3,257,516 A * 6/1966 Knowles .............. H04R 25/604 381/345
4,845,760 A * 7/1989 Awakowicz ............ H04M 1/03 381/189
7,088,839 B2 * 8/2006 Geschiere ............ H04R 25/604 381/361
10,405,085 B2 * 9/2019 Tiefenau .............. H04R 1/2857
10,616,680 B2 * 4/2020 Bolsman .................. H04R 1/08
10,687,153 B2 6/2020 Albahri et al.
(Continued)

FOREIGN PATENT DOCUMENTS

DE 102018221807 A1 7/2019

*Primary Examiner* — Ryan Robinson
(74) *Attorney, Agent, or Firm* — Laurence A. Greenberg; Werner H. Stemer; Ralph E. Locher

(57) ABSTRACT

A hearing device includes a loudspeaker having a loudspeaker diaphragm for generating acoustic signals, a drive or actuator acting on the loudspeaker diaphragm, and a loudspeaker housing in which the drive or actuator and the loudspeaker diaphragm are accommodated. A housing encloses a housing interior. A loudspeaker box is disposed in the housing interior and has a sound outlet opening coupled with a sound conductor leading out of the housing. The loudspeaker is sealed in the loudspeaker box against the housing interior in a fluid-tight manner. The loudspeaker is disposed in the loudspeaker box clear or free of a sound channel element, disposed within the loudspeaker box and coupling the loudspeaker with the sound outlet opening.

7 Claims, 2 Drawing Sheets

(56) References Cited

U.S. PATENT DOCUMENTS

| | | | | |
|---|---|---|---|---|
| 10,820,124 | B2 * | 10/2020 | Higgins | H04R 25/658 |
| 11,234,085 | B2 * | 1/2022 | Dominijanni | H04R 1/288 |
| 11,818,550 | B2 * | 11/2023 | Johnson | H04R 25/556 |
| 2003/0185412 | A1 * | 10/2003 | Gebert | H04R 25/604 381/353 |
| 2008/0112584 | A1 | 5/2008 | Karamuk | |
| 2014/0153755 | A1 | 6/2014 | Hug et al. | |
| 2015/0110328 | A1 * | 4/2015 | Sondergaard | H04R 1/02 381/354 |
| 2016/0277852 | A1 | 9/2016 | Lee et al. | |
| 2017/0280232 | A1 * | 9/2017 | Yang | H04R 1/021 |
| 2017/0325036 | A1 * | 11/2017 | Angst | H04R 25/604 |
| 2019/0261078 | A1 * | 8/2019 | Ouchi | H04R 1/1016 |
| 2022/0248126 | A1 * | 8/2022 | Hasegawa | G10K 11/22 |

* cited by examiner

HEARING DEVICE

CROSS-REFERENCE TO RELATED APPLICATION

This application claims the priority, under 35 U.S.C. § 119, of German Patent Application DE 10 2021 206 011.0, filed Jun. 14, 2021; the prior application is herewith incorporated by reference in its entirety.

FIELD AND BACKGROUND OF THE INVENTION

The invention relates to a hearing device, for example in the form of a hearing aid.

Hearing devices are typically used to output an audio signal to the sense of hearing of the wearer of the hearing device. The output takes place by using an output transducer, usually acoustically through airborne sound by using a loudspeaker (also referred to as a "receiver"). Such hearing devices are frequently used as so-called hearing aid devices (also in short: hearing aids). For that purpose, the hearing devices normally include an acoustic input transducer (in particular a microphone) and a signal processor, which is configured to process the input signal (also: microphone signal) generated by the input transducer from the ambient sound with application of at least one typically user-specific stored signal processing algorithm in such a way that a hearing loss of the wearer of the hearing device is at least partially compensated for. In particular in the case of a hearing aid device, the output transducer can be, in addition to a loudspeaker, alternatively also a so-called bone vibrator or a cochlear implant, which are configured for mechanical or electrical coupling of the sound signal into the sense of hearing of the wearer. The term hearing devices also additionally includes in particular equipment such as, e.g., so-called tinnitus maskers, headsets, headphones, and the like.

Typical configurations of hearing devices, in particular hearing aids, are behind-the-ear ("BTE") and in-the-ear ("ITE") hearing devices. Those designations are indicative of the intended wearing position. For example, behind-the-ear hearing devices have a (main) housing that is worn behind the ear cup. In that case the models can be distinguished into two types: the first being those having the loudspeaker disposed in the housing. In those the sound is usually output to the ear by using a sound tube, the end of which is worn positioned in the ear canal. The second type includes models that have an external loudspeaker placed in the auditory canal. In-the-ear hearing devices, on the other hand, have a housing that is worn in the ear cup or even entirely in the ear canal.

In particular, in hearing aids for people with severe hearing loss—usually in BTE hearing aids—particularly powerful loudspeakers are used, which can generate a comparatively high sound pressure level (e.g. of at least about 90 dB SPL). In order to prevent the sound produced from affecting other components, in particular the microphone or microphones, the loudspeakers are placed in an additional enclosure ("loudspeaker box") within the hearing aid housing. In that loudspeaker box, the loudspeaker is usually suspended by an elastomer cover and/or supported only at certain points in order to prevent transmission of structure-borne sound to the other components. In addition, the loudspeaker with its sound output nozzle—usually even independently of the loudspeaker box—is connected by an internal sound conducting element, usually a flexible tube, to a sound outlet opening of the hearing device, in the case of a BTE usually to a sound tube leading from the BTE housing to the ear.

Especially in such high-performance loudspeakers, however, so-called pumping effects often occur in the flexible sound conducting elements, which reduce the achievable gain. In some cases, feedback can occur in the range of approximately 1 to 2 kHz due to structure-borne sound and in the range of approximately 3-5 kHz due to airborne-sound feedback (also known as open loop gain feedback).

SUMMARY OF THE INVENTION

It is accordingly an object of the invention to provide an improved hearing device, which overcomes the hereinafore-mentioned disadvantages of the heretofore-known devices of this general type.

With the foregoing and other objects in view there is provided, in accordance with the invention, a hearing device including a loudspeaker having a loudspeaker diaphragm for generating acoustic signals, a drive or actuator that acts on the loudspeaker diaphragm, and a loudspeaker housing in which the drive or actuator and the loudspeaker diaphragm are accommodated. The hearing device also has a housing that encloses a housing interior, and a loudspeaker box, disposed in the housing interior, in which the loudspeaker is sealed against the housing interior in a fluid-tight manner. The loudspeaker box has a sound outlet opening coupled with a sound conductor leading out of the housing. In addition, the loudspeaker is disposed clear of or free of a sound channel element (or: sound conducting element) which is not provided in the present invention. Such a sound channel element would regularly be disposed inside the loudspeaker box and couple the loudspeaker with the sound outlet opening according to the prior art.

In other words, the loudspeaker is inserted in the loudspeaker box without such a—usually flexible—sound conducting element, also known as a sound tube.

Advantageous embodiments and refinements of the invention, which are partially inventive as such, are presented in the dependent claims and the following description.

Due to the absence of such a sound conducting element, the pumping effect which often occurs within the loudspeaker box at high gain can be avoided. This in turn prevents an airborne-sound induced coupling of vibrations into the loudspeaker box and/or the housing of the hearing device. In addition, the transmission of vibrations through the sound conducting element—due to vibrations of the loudspeaker itself and also due to the pumping effect—is prevented or at least reduced.

The drive or actuator of the loudspeaker is understood to mean any form of motion generation and transfer onto the loudspeaker membrane, as is known in particular in the field of hearing devices. For example, the drive unit can be an electromagnetically movable "armature" that forms a so-called "balanced armature," or a so-called "dynamic driver." MEMS technology can also be used, however.

Preferably, the hearing device is a BTE hearing aid, or "BTE" for short.

In a preferred embodiment, the loudspeaker housing is configured in such a way that the loudspeaker has an open front volume. Conveniently, the front volume of the loudspeaker is configured to be open by ensuring that the loudspeaker diaphragm on the sound output side is kept clear of a housing wall of the loudspeaker housing over a large proportion of its surface. Preferably, the loudspeaker membrane is kept clear of the housing wall over at least 50 percent, preferably over its entire surface. In other words, in the latter case the wall section that would cover the loudspeaker diaphragm is missing. In a balanced armature loudspeaker, which is usually rectangular in shape, the appropriate side wall is missing. A loudspeaker configuration with an open front volume improves the sensitivity in the high-frequency range, in particular in the frequency range relevant to speech.

In a practical configuration, the loudspeaker is rigidly connected to a floor wall of the loudspeaker box by a damping element forming a damping mat, in particular only over one side face of the loudspeaker. In particular, the loudspeaker is therefore not disposed in a cover and suspended by it in the loudspeaker box (hereafter referred to as "box") or supported by support elements at specific points. Due to the fixed connection, in particular in combination with the open front volume, which means that a so-called "spout" or sound output nozzle on the loudspeaker housing can be omitted (and in particular is not in fact present), the loudspeaker can also advantageously be positioned and aligned comparatively freely in the box. This allows the loudspeaker to be aligned in such a way that it is comparatively insensitive to shocks. In particular, the loudspeaker is attached to the damping mat and to the floor wall of the box with the "rear side" of the loudspeaker facing away from the loudspeaker diaphragm.

In a practical development, the damping mat has a support layer formed from an elastomer. This support layer in turn forms at least one damping chamber filled with a fluid, in particular with a gas, between the loudspeaker and the loudspeaker box. This results in a comparatively high damping effect, even with only one-sided bracing against the damping element.

Furthermore, the support layer preferably has a number of pillar-shaped support elements. These support elements are configured as cylindrical or hour-glass-like columns or pillars, cones, pyramids or the like, and brace the damping chamber against the loudspeaker, loudspeaker box, or a covering layer of the damping mat. Preferably, the support layer forms a kind of trough which is open towards an upper side and in which the support elements are distributed. During the manufacture of the damping mat, this trough is preferably covered (i.e. closed off) with a covering layer optionally formed by a different, in particular harder material, e.g. an elastomer with a higher Shore hardness than the support layer, and filled with the fluid. The support elements advantageously enable an even load distribution over the entire surface of the damping mat.

In one practical embodiment, the box is made of a soft magnetic alloy with high magnetic permeability, known under the brand name "Mumetal," for example. This makes the box comparatively rigid and can also contribute to the shielding of other electrical and/or electronic components of the hearing device against the loudspeaker.

Preferably, the box is formed of two partial shells. The loudspeaker is attached to the floor wall facing the hearing device housing, in particular the "lower" partial shell. This is preferably connected surface-to-surface to the housing of the hearing device or to an electronic carrier disposed in the housing.

In a further practical embodiment, the box is configured by using a simulation with regard to the lowest possible resonance, both under airborne and structure-borne sound excitation. Preferably, this or a comparable simulation also allows the volume of the box to be kept as small as possible.

In addition, the loudspeaker box preferably also has an elastomer-sealed cable feed-through, through which connecting cables (in particular connecting wires) of the loudspeaker (or for the loudspeaker) are routed.

The conjunction "and/or" in this case and in the following is to be understood, in particular, to mean that features linked by this conjunction can be implemented both jointly and as alternatives to each other.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
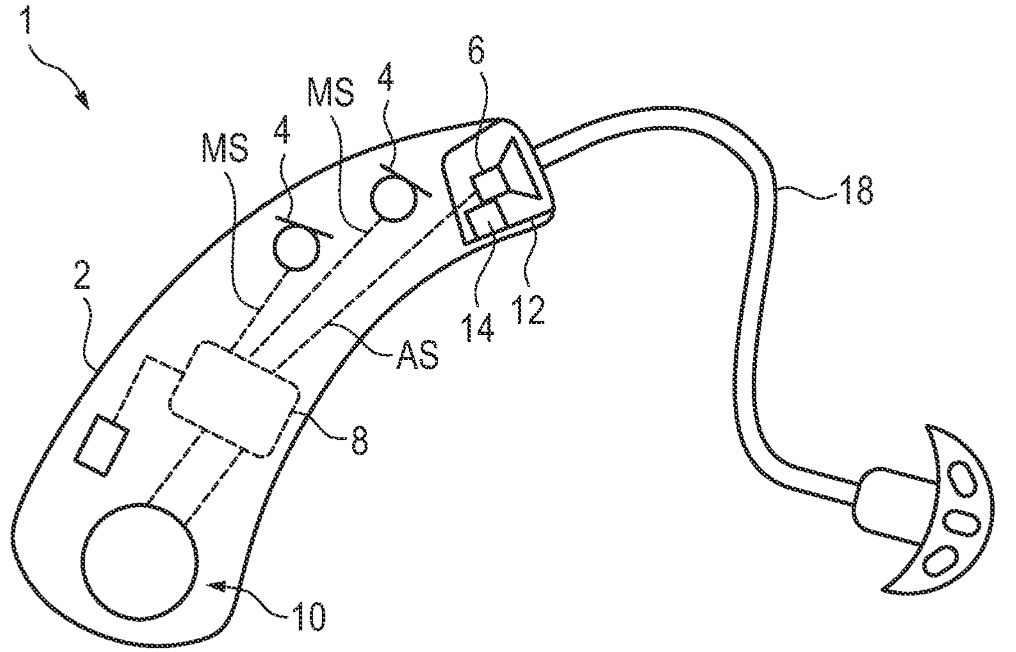
FIG. 1 is a diagrammatic, longitudinal-sectional view of a hearing device.

Referring now in detail to the figures of the drawings, in which parts corresponding to one another are always provided with the same reference signs, and first, particularly, to FIG. 1 thereof, there is seen a hearing device in the form of hearing aid equipment, specifically hearing aid equipment to be worn behind the ear of the user (also referred to as a hearing aid for short; denoted in this case as "BTE 1"). The BTE 1 includes a housing 2, in which electronic components of the BTE 1 are disposed. These electronic components are, for example, two microphones 4, a loudspeaker 6, a signal processor 8, and a battery module 10. The microphones 4 are used in the intended operation of the BTE 1 for receiving ambient sound and converting it into electrical input signals (also: "microphone signals MS"), which are processed (in particular filtered, amplified and/or damped depending on frequency, etc.) by the signal processor 8 (also referred to as "controller"). The processed input signals are subsequently output at the loudspeaker 6 as output signals AS and converted thereby into sound signals and transmitted to the hearing system of the user.

In order to protect the microphones 4 from feedback with the loudspeaker 6, the latter is enclosed in a loudspeaker box ("box 12" for short) disposed inside the housing 2. In this box 12, the loudspeaker 6 is attached, decoupled from vibration as far as possible, by using a damping element 14 described in more detail below.

Figure 2:
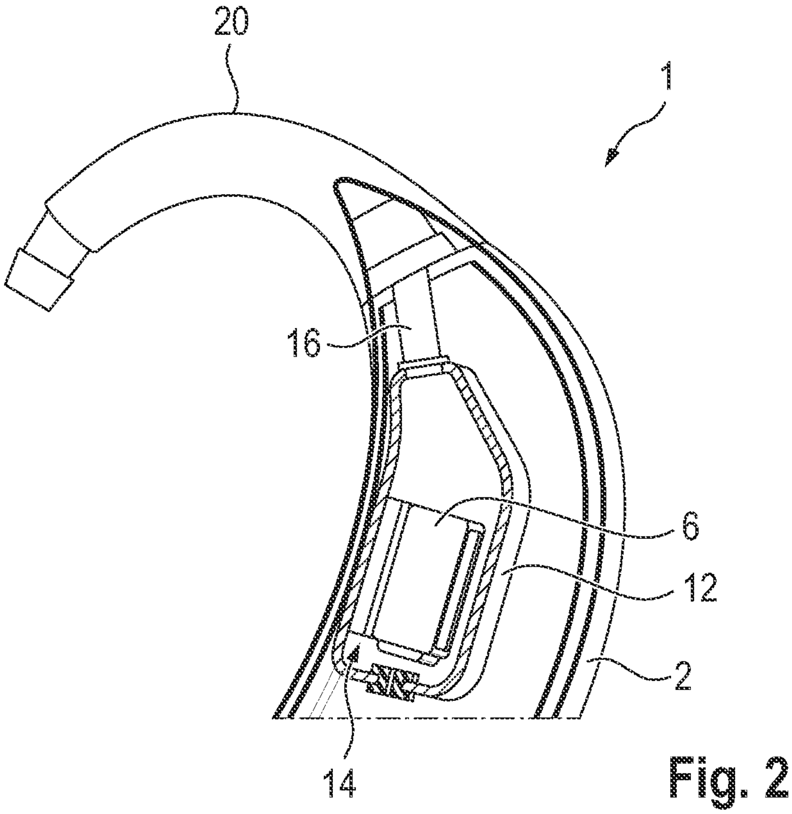
FIG. 2 is a fragmentary, enlarged, longitudinal-sectional view of the hearing device.

As can be seen from FIG. 2, the box 12 is connected to a tube-like sound tunnel 16 which is configured to guide the airborne sound generated by the loudspeaker 6 into a sound tube 18 leading from the housing 2 to the user's ear, specifically, first into a so-called ear hook 20 (not shown in FIG. 1). Within the box 12, however, no sound tube is present between the loudspeaker 6 and a sound outlet opening 22 (see FIG. 3) of the box 12. This prevents or reduces the transmission of vibrations through the sound tube to the box 12 and thus to the housing 2 of the BTE 1 and in turn through the latter to the microphones 4. In addition, no pumping of the sound tube due to sound pressure can occur within the box 12, which can result in a loss of power on the hand and to airborne feedback on the other.

Figure 3:
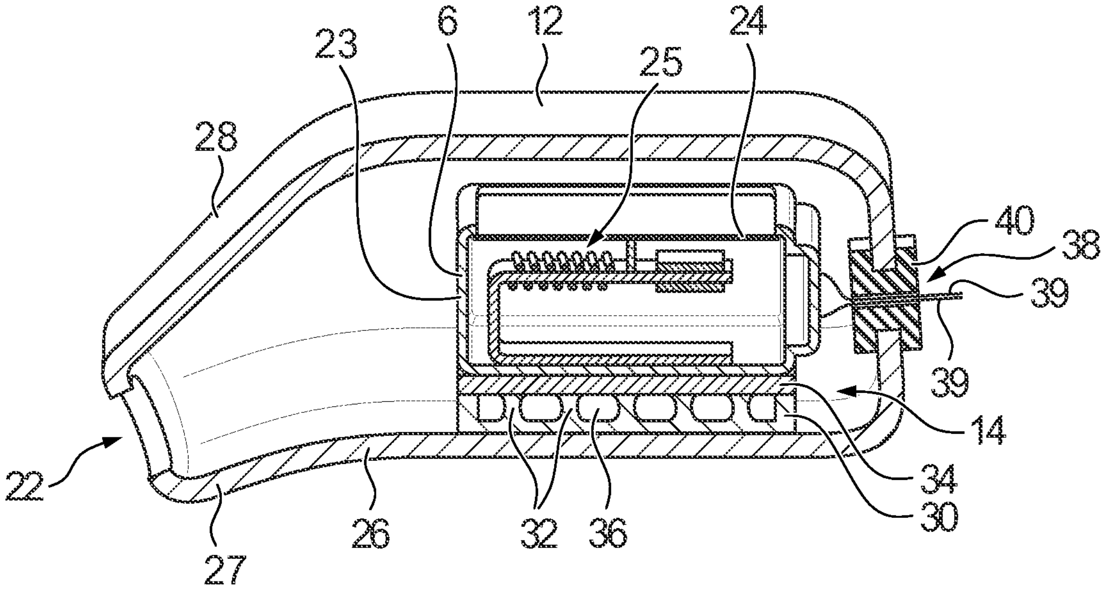
FIG. 3 is a further enlarged, longitudinal-sectional view of a loudspeaker box and a loudspeaker of the hearing device.

Since there is no sound tube present inside the box 12, the speaker 6 can also be adapted. For this purpose, the loudspeaker 6 is configured with an open front volume, in which a "lid" of the loudspeaker housing 23, which would be disposed above the sound output side of a loudspeaker diaphragm 24 (see FIG. 3) is missing or omitted. In FIG. 3, the loudspeaker 6 is configured as a "balanced armature receiver" that includes a drive 25 acting on the diaphragm 24. The open front volume enables high sensitivity of the BTE 1 in the high-frequency range, in particular in the speech range.

In addition, the loudspeaker 6 is rigidly connected to the box 12, specifically adhesively bonded, to a floor wall 26 of a lower partial shell 27 (in the figures no dividing lines are shown between an upper partial shell 28 and the lower partial shell 27) of the box 12. In this case, the damping element 14 mentioned above is interposed between the two parts.

The damping element 14 is formed by a damping mat. This is formed by a damping layer 30 (also called "support layer") formed of a first elastomer with comparatively low Shore hardness and has an approximately rectangular trough, from the floor of which a plurality of pillars 32 project upwards as a support structure. The trough is closed off by a covering layer 34 formed of a second elastomer with higher Shore hardness, so that the interior of the trough forms a gas-filled damping chamber 36. The damping element 14 is adhesively bonded to the floor wall 26 and the loudspeaker 6 is in turn bonded to the damping element 14.

An opening 38 of the box 12 for feeding connecting wires 39 through to the loudspeaker 6 is sealed sufficiently tightly by using a rubber insert or cable feed-through 40.

The box 12 is additionally made of a soft magnetic metal with high permeability.

The subject matter of the invention is not restricted to the above-described exemplary embodiment. Rather, further embodiments of the invention can be derived by a person skilled in the art from the above description.

The following is a summary list of reference numerals and the corresponding structure used in the above description of the invention.

LIST OF REFERENCE SIGNS

1 BTE
2 Housing
4 Microphone
6 Loudspeaker
8 Signal processor
10 Battery module
12 Box
14 Damping element
16 Sound tunnel
18 Sound tube
20 Ear hook
22 Sound outlet opening
24 Loudspeaker diaphragm
26 Floor wall
30 Damping layer
32 Pillar
34 Covering layer
36 Damping chamber
38 Opening
39 Connection wire
40 Rubber insert
MS Microphone signal
AS Output signal

The invention claimed is:

1. A hearing device, comprising:

a housing enclosing a housing interior;

a sound conductor leading out of said housing;

a loudspeaker including a sound output side, a loudspeaker housing, a loudspeaker diaphragm disposed in said loudspeaker housing for generating acoustic signals and a drive disposed in said loudspeaker housing for acting on said loudspeaker diaphragm;

said loudspeaker housing having a housing wall with a surface, and said loudspeaker housing configured to provide said loudspeaker with an open front volume;

said loudspeaker diaphragm on said sound output side being kept clear of said housing wall of said loudspeaker housing over between 50 percent and 100 percent of said surface of said housing wall, to keep said front volume of said loudspeaker open;

a loudspeaker box disposed in said housing interior, said loudspeaker box having a sound outlet opening coupled with said sound conductor;

said loudspeaker being disposed in said loudspeaker box and fluid-tightly sealed against said housing interior; and said loudspeaker being disposed in said loudspeaker box without a sound channel element which would be disposed within said loudspeaker box and would couple said loudspeaker with said sound outlet opening, there being no sound channel element present within said loudspeaker box between said loudspeaker and said sound outlet opening.

2. A hearing device, comprising:

a housing enclosing a housing interior;

a sound conductor leading out of said housing;

a loudspeaker including a loudspeaker housing, a loudspeaker diaphragm disposed in said loudspeaker housing for generating acoustic signals and a drive disposed in said loudspeaker housing for acting on said loudspeaker diaphragm;

a loudspeaker box disposed in said housing interior, said loudspeaker box having a sound outlet opening coupled with said sound conductor, and said loudspeaker box having a floor wall;

a damping mat fixedly connecting said loudspeaker to said floor wall, said damping mat having a support layer made of an elastomer, said support layer forming at least one damping chamber filled with fluid between said loudspeaker and said loudspeaker box;

said loudspeaker being disposed in said loudspeaker box and fluid-tightly sealed against said housing interior; and said loudspeaker being disposed in said loudspeaker box without a sound channel element which would be disposed within said loudspeaker box and would couple said loudspeaker with said sound outlet opening, there being no sound channel element present within said loudspeaker box between said loudspeaker and said sound outlet opening.

3. The hearing device according to claim 2, wherein said damping mat has a covering layer, and said support layer has a plurality of pillar-shaped supports bracing said damping chamber against said loudspeaker, said loudspeaker box or said covering layer.

4. The hearing device according to claim 1, wherein said loudspeaker box is made of a soft magnetic alloy with high magnetic permeability.

5. The hearing device according to claim 1, wherein said loudspeaker box has a floor wall, said loudspeaker box is formed of two partial shells, and said loudspeaker is fixed to said floor wall facing said housing of the hearing device.

6. The hearing device according to claim 1, wherein said loudspeaker box is configured by simulation to have a lowest possible resonance both under airborne and structure-borne sound excitation.

7. The hearing device according to claim 1, wherein said loudspeaker box includes an elastomer-sealed cable feed-through, and said loudspeaker has connecting leads routed through said cable feed-through.

* * * * *